United States Patent
Pels et al.

[11] Patent Number: 6,109,237
[45] Date of Patent: Aug. 29, 2000

[54] APPARATUS FOR CONTROLLING THE IDLING SPEED OF AN INTERNAL COMBUSTION ENGINE

[75] Inventors: Thomas Pels, Achern; Klaus Revermann, Schwerinsdorf; Klaus-Peter Zeyen, Köln, all of Germany

[73] Assignee: ISAD Electronic Systems GmbH & Co. KG, Cologne, Germany

[21] Appl. No.: 09/368,372

[22] Filed: Aug. 4, 1999

Related U.S. Application Data

[63] Continuation of application No. PCT/EP98/00608, Apr. 2, 1998.

[30] Foreign Application Priority Data

Feb. 4, 1997 [DE] Germany .............. 197 04 153

[51] Int. Cl.⁷ .............. F02D 41/00
[52] U.S. Cl. .............. 123/339.19; 123/339.11
[58] Field of Search ............ 123/339.11, 339.19, 123/339.21, 339.16; 290/40 A

[56] References Cited

U.S. PATENT DOCUMENTS

| | | | |
|---|---|---|---|
| 4,883,034 | 11/1989 | Yashiki et al. | 123/339.19 |
| 4,969,435 | 11/1990 | Morikawa et al. | 123/339.19 |
| 5,256,959 | 10/1993 | Nagano et al. | 322/25 |
| 5,270,575 | 12/1993 | Togai et al. | 290/40 |
| 5,467,008 | 11/1995 | Uchinami | 322/27 |
| 5,765,528 | 6/1998 | Kamimaru | 123/339.19 |
| 5,921,149 | 7/1999 | Masberg et al. | 74/574 |
| 5,954,025 | 9/1999 | Kanamaru et al. | 123/339.11 |

FOREIGN PATENT DOCUMENTS

| | | |
|---|---|---|
| 0 354 790 A2 | 2/1990 | European Pat. Off. . |
| 0 743 211 A2 | 11/1996 | European Pat. Off. . |
| 34 42 112 C2 | 5/1986 | Germany . |
| 40 15 701 A1 | 5/1990 | Germany . |
| 41 08 751 A 1 | 9/1991 | Germany . |
| 43 25 505 A 1 | 2/1994 | Germany . |
| 44 23 577 C2 | 8/1995 | Germany . |
| 5-340282 | 12/1993 | Japan . |
| 6-200781 | 7/1994 | Japan . |
| 7-305635 | 11/1995 | Japan . |

*Primary Examiner*—John Kwon
*Attorney, Agent, or Firm*—Marshall, O'Toole, Gerstein, Murray & Borun

[57] ABSTRACT

An apparatus for controlling an idling speed of an internal combustion engine is disclosed. The apparatus includes an electric machine operatively coupled to the internal combustion engine for applying a braking torque to the internal combustion engine to reduce the idling speed and for applying a driving torque to the internal combustion engine to increase the idling speed. It also includes a controller for controlling the electric machine. The controller is responsive to a load change to control the electric machine to apply one of a braking torque and a driving torque to the internal combustion engine to substantially maintain the idling speed at a predefined level.

11 Claims, 5 Drawing Sheets

Prior Art

APPARATUS FOR CONTROLLING THE IDLING SPEED OF AN INTERNAL COMBUSTION ENGINE

This application is a continuation of PCT/EP98/00608 filed Apr. 2, 1998.

FIELD OF THE INVENTION

The invention relates generally to internal combustion engines, and, more particularly, to an apparatus for controlling the idling speed of an internal combustion engine used in a vehicle.

BACKGROUND OF THE INVENTION

When a conventional wheeled vehicle is driven, an internal combustion engine of the vehicle drive system develops a torque which is applied to an engine shaft, transferred via a clutch to a gear shaft, and then delivered to an axle drive shaft via a transmission. On the other hand, when the vehicle enters an idling state, torque transfer in the drive train is interrupted, for example, by engaging the clutch or shifting to neutral. During idling, the internal combustion engine is not used to drive the vehicle and, thus, the internal combustion engine experiences a reduced load. However, even in the idling state, the internal combustion engine must still carry a load resulting from both its own internal friction and the mechanical and electrical auxiliary units connected to the engine shaft (e.g., pumps, servo drives, and/or a generator).

In order to keep fuel consumption, pollutant emissions and noise development low, the idle speed should be set as low as possible. However, the idle speed can only be reduced to a certain speed (i.e., the so-called critical speed). Below this critical speed, the internal combustion engine haltingly turns or even stops, since the instantaneously stored kinetic rotational energy is not sufficient to apply the compression and acceleration work essential for a compression stroke. Idling, in the broader sense, is therefore understood to mean any operating condition of the drive system in which the internal combustion engine has no vehicle drive function and runs at the lowest possible speed close to and above the critical speed.

In ordinary drive systems, the idling or idle speed is controlled by changing the supplied amount of air and/or the air-fuel ratio and/or the ignition point. By controlling these factors, the idle speed should then assume a specific set value (the so-called set idle speed) regardless of the instantaneously present operating conditions and regardless of load fluctuations associated with the auxiliary units. The set idle speed is located at a certain safety margin above the critical speed. The safety margin is essential even if no load fluctuations are expected during idling since ordinary idle controls do not guarantee very accurate constancy of idle speed at the set value. Since idling speed variations are present even in the absence of a load fluctuation, a safety margin must be present to rule out the possibility of falling short of the critical speed,. The effect of load fluctuations on the idle speed is then added to the safety margin.

It should be noted that the term "control" as used throughout the present text is understood in a broad sense, which embraces the terms "open loop control" (i.e., influencing a quantity in an open control loop or action chain) and "regulation" (i.e., influencing a quantity based on comparison with another stipulated quantity (i.e., closed loop control)). The same broad definition applies for derived terms, like "to control", "control device", etc.

Although the ordinary approaches to idle speed control mentioned above do function in principle, they suffer from certain drawbacks. For example, controlling idle speed by adjusting the air supply or air-fuel ratio (so-called "filling intervention") is relatively slow such that, after a deviation, a relatively long time passes before the set idle speed is reached again. This is disadvantageous because, in order to be able to rapidly counteract a change in the idle speed (and especially to avoid falling short of the critical speed), the torque of the internal combustion engine must be raised very quickly.

Special control methods which lead to more rapid adjustment of the idle speed have therefore already been proposed in the prior art. These prior art control methods are based, for example, on so-called disturbance variable compensation (a disturbance, for example, is a large consumer of power). Such filling intervention control also requires a relatively large safety margin from the critical speed and, thus, a relatively high idle speed.

Control based on adjustment of the ignition point (so-called "ignition intervention") permits very rapid return of the idle speed to the set idle speed. Ignition intervention is based on the facts that a later ignition point leads to a smaller torque and, conversely, that an earlier ignition point leads to a higher torque. The ignition point during the idling operation is set "late". The torque can, therefore, be rapidly increased during an idling speed reduction by adjusting the ignition point from "late" to "early" to thereby prevent the idling speed from falling short of the critical speed.

However, the internal combustion engine inherently runs with lower efficiency when a late ignition point is set than when an early ignition point is set. For this reason, idle speed control with ignition intervention also leads to relatively high fuel consumption.

EP 0 743 211 A2 concerns a stop procedure of the internal combustion engine in a hybrid vehicle.

DE 34 42 112 C2 concerns gear shunting during fuel cutoff in the overrun to drive secondary units with the axle drive of the vehicle.

DE 43 25 505 A1 and DE 41 08 751 C2 concern control types of the generator of a vehicle in which the generator is controlled to reduce braking torque in the event of load engagement in order to contribute to keeping the idle speed constant. Engagement of electrical loads is involved in the first-mentioned document.

SUMMARY OF THE INVENTION

In accordance with an aspect of the invention, an apparatus is provided for controlling an idling speed of an internal combustion engine. The apparatus includes a first control system for adjusting the idling speed of the internal combustion engine in response to a load change experienced by the internal combustion engine. The first control system has a first reaction time. The apparatus also includes a second control system for adjusting the idling speed of the internal combustion engine in response to the load change. The second control system has a second reaction time which is shorter than the first reaction time.

Preferably, the second control system includes an electric machine operatively coupled to the internal combustion engine for applying a braking torque to the internal combustion engine to reduce the idling speed and for applying a driving torque to the internal combustion engine to increase the idling speed. The second control system also includes an inverter for supplying power to the electric machine, and a controller in communication with the inverter for controlling the electric machine. The controller is responsive to the load change to control the electric machine to reduce a braking torque or apply a driving torque to the internal combustion engine to substantially maintain the idling speed at a predefined level until the first reaction time has expired.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
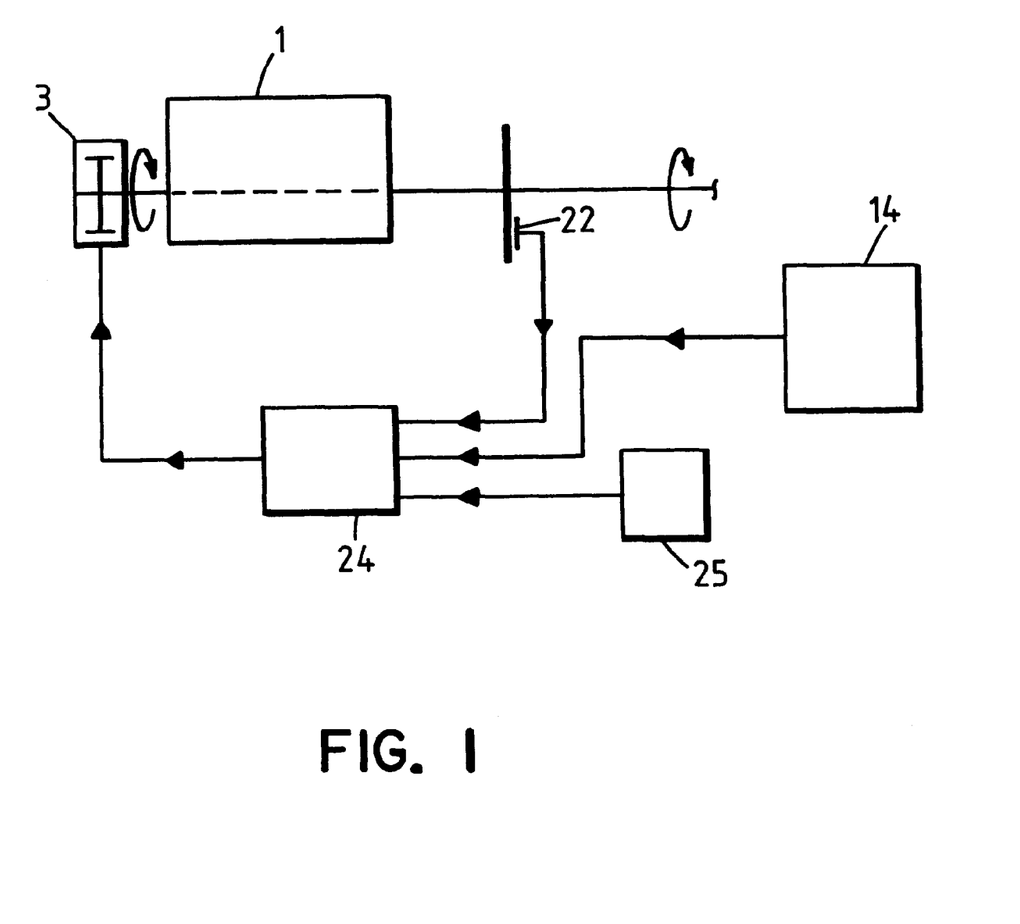
FIG. 1 is a schematic illustration of a drive system constructed in accordance with the teachings of the instant invention.

A drive system constructed in accordance with the teachings of the invention is shown generally in FIG. 1. Although the illustrated drive system is shown in the context of a vehicle, (for example, a passenger car), persons of ordinary skill in the art will appreciate that the teachings of the invention are in no way limited to any particular environment of use. On the contrary the teachings of the invention may be applied to any engine that would benefit from the enhanced control of the engine idling speed they provide.

The exemplary drive system illustrated in FIG. 1 includes an internal combustion engine 1, an electric machine 3, a speed sensor 22, a regulator 24, and a set or target idle speed value adjuster 25. The set idle speed value adjuster 25 delivers a constant set idle speed value to the regulator 24. The regulator 24 compares the actual value of the idle speed of the internal combustion engine 1 as measured by the speed sensor 22 to the set idle speed value, and, if a difference between the compared values is detected, causes the electric machine 3 to apply a torque that brings the actual idle speed to the set idle speed value. Rotation irregularities of the internal combustion engine 1 caused by gas and inertial forces are not considered in the actual idle speed value used in the comparison. These irregularities can be eliminated by, for example, corresponding averaging or filtering of their amounts.

The set idle speed value can be optionally changed, for example, as a function of changes in the operating conditions experienced by the engine 1 (e.g., the temperature of the internal combustion engine 1) in which the time constants of such operating condition changes (and, thus, the time constant of the changes in the set idle speed value) are large relative to that of typical idle speed changes. The term "constant set value" is to be understood in this sense.

Another signal at the input of the regulator 24 indicates whether mechanical consumers 14 or other loads are connected or disconnected. Monitoring these disturbance variables permits corresponding intervention with the electric machine 3 even before the load change causes a change in the idling speed of the engine. The electric machine 3, therefore, functions as a control element in an idle speed control loop.

Figure 2:
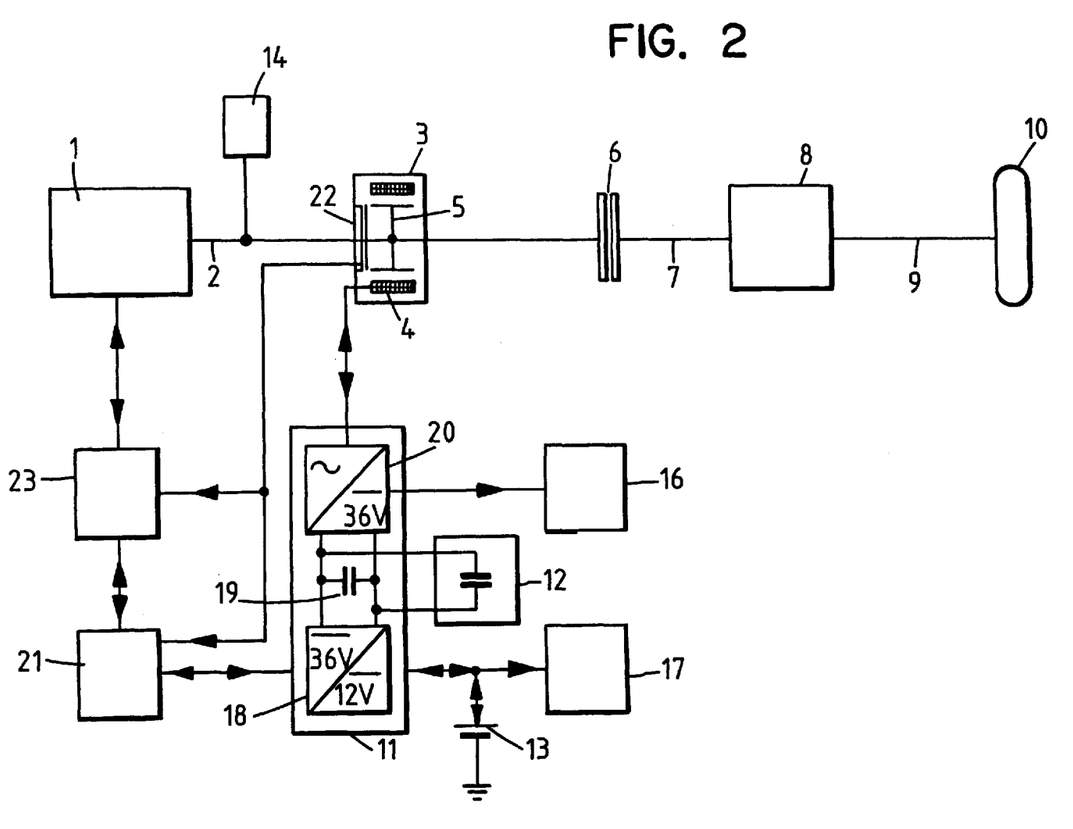
FIG. 2 is a more detailed schematic illustration (not to scale) of the drive system of FIG. 1.

A more detailed illustration of the drive system is shown in FIG. 2. In the example of FIG. 2, the internal combustion engine 1 of the drive system is a four-cylinder spark-ignition engine. It applies a torque to an engine shaft 2. Consumers 14, (for example, a compressor for an air conditioner and/or a pump for a servo drive), are mechanically connected to the engine shaft 2.

In the example of FIG. 2 the electric machine 3 is a three-phase induction machine in an asynchronous or synchronous design. The three-phase induction machine 3 comprises a stator 4 and a rotor 5. The stator 4 is fixedly supported against the internal combustion engine 1 or against a clutch housing (not shown). The rotor 5 sits on the engine shaft 2 and is connected or can be connected to rotate in unison with the shaft 2. The electric machine 3 can be operated as a motor or as a generator. It can, therefore, apply driving or braking torques to the engine shaft 2, depending upon its mode of operation.

During vehicle operation (i.e., driving or moving the car under the power of the engine 1), the torque generated by the internal combustion engine 1 is transferred from the engine shaft 2 via a clutch 6 to a gear shaft 7, and via a gear 8 to a drive shaft 9 and drive wheels 10 as is conventional. During idling operation, on the other hand, the internal combustion engine is decoupled from the drive shaft 9 (e.g., the engine shaft 2 is disconnected from the gear shaft 7 via clutch 6 or the gear is released, (i.e., the gear shaft 7 is disconnected from the drive shaft 9)). In the example of FIG. 2, the clutch 6 and the gear 8 are implemented by a friction clutch and a gear box, respectively, or alternatively, by an automatic transmission or a converter clutch with a gear box, (automatic or infinitely variable change-speed gear).

As mentioned above, the electric machine 3 functions as a controlled element in an idle speed control loop. When the measured idle speed of the internal combustion engine 1 (averaged over the rotation irregularities) is reduced below the set idle speed value, the electric machine 3 applies a driving torque or superimposes such a driving torque on a braking torque it is already generating (e.g., it reduces the braking torque it is applying). Conversely, when the measured idle speed of the internal combustion engine 1 (averaged over the rotation irregularities) is increased above the set idle speed value, the electric machine 3 applies a braking torque or superimposes such a braking torque on a driving torque it is already generating (e.g., it reduces the driving torque it is applying). In this manner, the electric machine 3 counteracts both reductions and increases in the measured idle speed to quickly return and maintain the idle speed of the internal combustion engine 1 at the set idle speed value.

When the electric machine 3 generates a driving torque, it functions as a motor. The electric power required to perform this function can initially be taken from an intermediate accumulator 19 of an inverter 11. (The intermediate accumulator 19 primarily functions as a smoothing capacitor.) When a longer-lasting demand is experienced, the electric power required to drive the electric machine 3 as a motor is taken from a first energy accumulator 12 and, if this is not sufficient, optionally from a second energy accumulator 13. The power drawn from the first and second accumulators 12, 13 is converted to the appropriate level and type by the inverter 11. Although the energy accumulators 12, 13 can be designed as batteries, flywheels, capacitors or combinations thereof, in the illustrated example the first energy accumulator 12 is implemented by a capacitor and the second energy accumulator 13 is implemented by a battery. As shown in FIG. 2, the intermediate circuit has increased voltage (for example, 36 V) relative to a low voltage network (for example, 12 V). The accumulators 19 and 12 lie at the increased voltage level of the intermediate circuit, while the accumulator 13 lies at the relatively low level of the low voltage network.

When the electric machine 3 generates a braking torque, it functions as a generator. The electrical power generated in this case can be fed to the energy storage device 12 at the intermediate circuit level, and optionally, to the energy storage device 13 from whence it can be reused for other purposes (i.e., recovered).

In addition to its task as a control element in the idle speed control loop, the electric machine 3 preferably has additional functions. For example, on the one hand, it serves as starter for the internal combustion engine 1 and, therefore, replaces the starter motor ordinarily provided separately in the vehicle. On the other hand, during vehicle operation and during idling (if possible without conflicting with its idle speed adjustment task), it serves as a generator. It, therefore, also replaces the separate generator ordinarily present in the vehicle. In the example of FIG. 2, at times in which the electric supply generated by the electric machine 3 is reduced or eliminated (i.e., when the electric machine 3 is exerting a braking or driving effect for the purpose of keeping the idle speed constant), the electric consumers 16 acquire at least part of their power from the energy storage device 12 at the high voltage level and the electric consumers 17 from the energy storage device 13 at the low voltage level. The consumers 17 fed with the low voltage are those with low power uptake, (for example, lights and electronic equipment), and the consumers 16 fed with high voltage are those with high power uptake, (for example, electric heaters). In addition, the electric machine 3 can also contribute to driving the vehicle and its braking, (i.e., function as a "booster" and as a "retarder"). During the driving effect, the electric machine 3 is supplied from the energy storage device 12 lying at the high intermediate circuit voltage level.

The inverter 11 delivers pulse-width-modulated sinusoidal voltage pulses at high cycle frequency to a stator winding of the electric machine 3. The stator winding produces essentially sinusoidal three-phase currents under the influence of the machine inductance. The amplitude, frequency and phase of the generated currents are freely selectable. Four-quadrant, operation of the electric machine 3 is therefore possible with freely adjustable "speed" and "torque".

The voltage pulses are generated by means of appropriate power semiconductor switches (for example, field effect transistors or IGBTs).

The inverter 11 is a voltage intermediate circuit inverter and essentially includes three components, namely, (1) a DC to DC converter 18 (input component) which converts direct current from a low level (e.g., 12 V) to a higher intermediate circuit level (e.g., 36 V) and in the opposite direction; (2) the intermediate circuit storage device 19, here a capacitor or an arrangement of parallel-connected capacitors; and (3) a DC to AC machine inverter 20 (output component) which can generate the (timed) three-phase AC voltage of variable amplitude, frequency and phase from the intermediate circuit DC voltage or, during generator operation of electric machine 3 convert the AC voltages developed by the machine 3 to the intermediate circuit DC voltage.

In addition to the intermediate circuit storage device 19, the first energy storage device 12 and the electric high-power consumer 16 are connected to the intermediate circuit and lie at its higher voltage level.

A control device 21 stipulates the amplitude, frequency and phase of the AC voltage generated by the inverter 11 through corresponding control of its semiconductor switch. The amplitude, frequency and phase of the AC voltage is selected based upon the accelerating or braking torque to be delivered by the electric machine 3.

The torque settings for controlling the idling speed are obtained by the controller 21 from an internal combustion engine control unit 23. The internal combustion engine control unit 23 is coupled to the speed sensor 22 (implemented in this example by an incremental sensor or a rotating transformer—a so-called resolver) and contains the set value adjuster 25 (not shown here). Based on the speed measurement, the control unit 23 determines an actual speed value averaged over the rotation irregularities, compares this actual speed value with the set idle speed value, and, when a deviation is present, sends a corresponding control signal to the control unit 21. The control unit 23, therefore, combines the functions of the controller 24 and the set value adjuster 25 of FIG. 1. In other variants (not shown), the functions of the controller 21 and the control unit 23 are combined in one apparatus.

The controller 21 preferably communicates with additional control equipment. For example, it identifies the amount of electrical power required to charge the energy storage devices 16, 17 to an energy consumption control unit (not shown) so that the controller 21 can execute the corresponding generator function of the electric machine 3. The internal combustion engine control unit 23 also stipulates the starter, booster and retarder functions.

The internal combustion engine control unit 23 also controls fuel consumption, exhaust composition, torque and speed of the internal combustion engine 1 via the supplied amount of air (if this is not stipulated by the driver by the gas pedal position), excess air factor, ignition point, injection point, valve opening and closure, etc. In variants in which idle control is based on both filling intervention and intervention with the electric machine 3, the control device 23 also produces a corresponding change in air or fuel amount, in addition to controlling the electric machine 3 during deviations of actual idle speed from the set idle speed. These two interventions can occur simultaneously or be staggered in time.

The entire system including the electric machine 3 and the internal combustion engine 1 is controlled via the gas pedal position, by brake, clutch and gear activation, and by operating quantities (e.g., crankshaft speed, crankshaft angle (internal combustion engine temperature), knocking, measured lambda value, etc.).

The idle speed controller 24 preferably has P (proportional control) or PI (proportional plus integral control) characteristics. With particular preference, it also has D (derivative) characteristics (overall, PID (i.e., proportional plus integral plus derivative control)), in order to respond to changes in speed before these changes manifest themselves in noticeable deviations from the set idle speed value. When filling intervention is also provided after an idle speed change, the intervention of the electric machine 3 can be withdrawn after a certain time since the internal combustion engine 1 can maintain the set idle speed as a result of the filling intervention alone. During idle control with disturbance variable compensation (not shown in FIG. 2 but shown in FIG. 1), even more rapid intervention of the electric machine 3 is possible. Specifically, the intervention of the electric machine 3 can be initiated even before a change in the idle speed is detected because the controller 24 (e.g., 21, 23 in FIG. 2) is notified of an imminent load change before that change occurs.

Figure 3A:
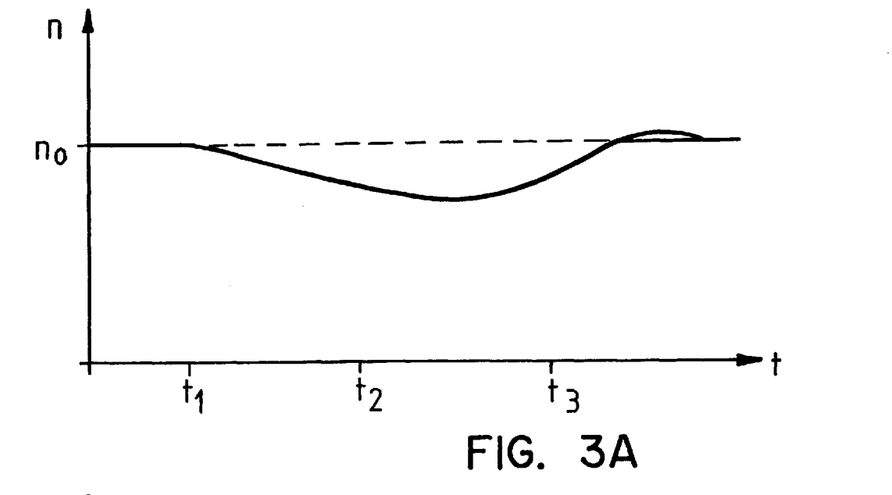
FIG. 3A is a graph illustrating an exemplary change in the idle speed of the drive system of FIGS. 1 and 2 in response to the addition of a load.
Figure 3B:
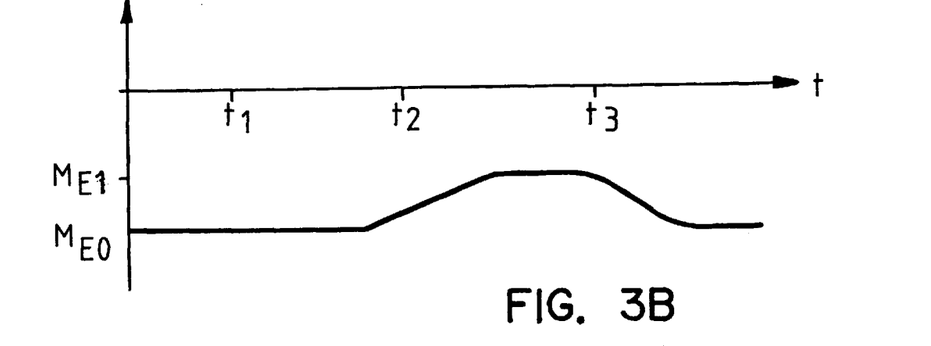
FIG. 3B is a graph illustrating an exemplary change in the torque applied by the electric machine of the drive system of FIGS. 1 and 2 in response to the addition of a load.
Figure 3C:
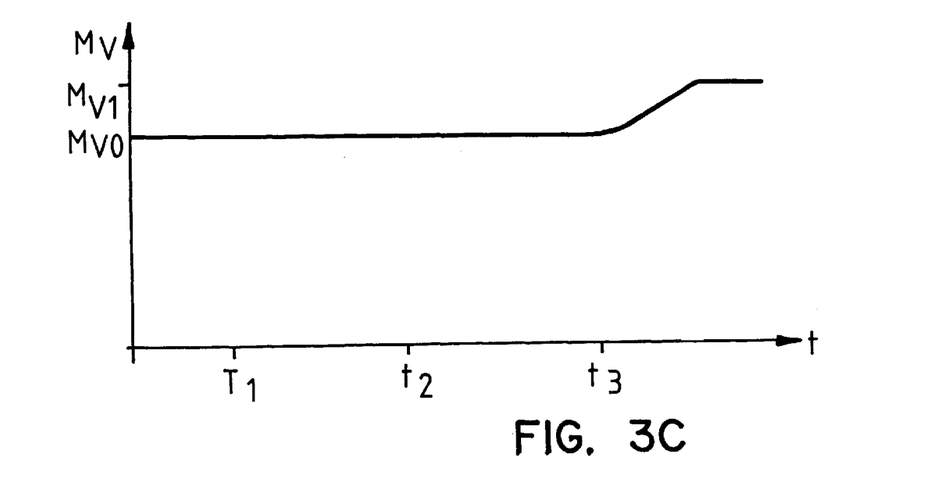
FIG. 3C is a graph illustrating an exemplary change in the torque applied by the internal combustion engine of the drive system of FIGS. 1 and 2 in response to the addition of a load.

An example of the method of action of an exemplary drive system constructed in accordance with the teaching of the invention is explained in FIGS. 3A–3C. The actual idle speed n, the set idle speed $n_0$, the torque $M_e$ applied by an electric machine 3 to the engine shaft 2, and the torque $M_v$ applied by the internal combustion engine 1 to the engine shaft 2, are each shown as a function of time t in FIGS. 3A–3C. In this example, the electric machine 3 initially applies a braking torque $M_{e0}$ as it performs its generator function to generate electrical power.

At time $t_1$ load engagement of a mechanical consumer 14 occurs. This load engagement is reflected in FIG. 3A in the form of a jump function with a jump at $t_1$. The load engagement causes an increased countertorque on the engine shaft 2 which causes the idle speed n to initially drop below the set idle speed $n_0$ (see FIG. 3A). As shown in FIG. 3B, the electric machine 3 responds to this drop by reducing the braking torque it applies from $M_{e0}$ to $M_{e1}$ at time $t_2$ (owing to unavoidable delays) until the idle speed n again reaches the set idle speed $n_0$ (see FIG. 3A). During this time, the high-power consumer 16 is at least partially supplied with power by the storage device 12 lying at the increased intermediate circuit level. In instances where the electric machine 3 applies a driving torque to the shaft 2 (as opposed to a braking torque), the storage device 12 also supplies the electric machine 3.

At time $t_3$, the electric machine 3 can increase its braking torque (here by returning to the original braking torque level $M_{e0}$), since the internal combustion engine 1 has since increased the torque it provides (here from $M_{v0}$ to $M_{v1}$) by, for example, a conventional filling intervention (see FIG. 3C). As shown in FIG. 3A, the idle speed remains almost at the set idle speed value during this transition. With the braking torque restored, the electric machine 3 can again generate electrical power at its previous level.

Figure 4A:
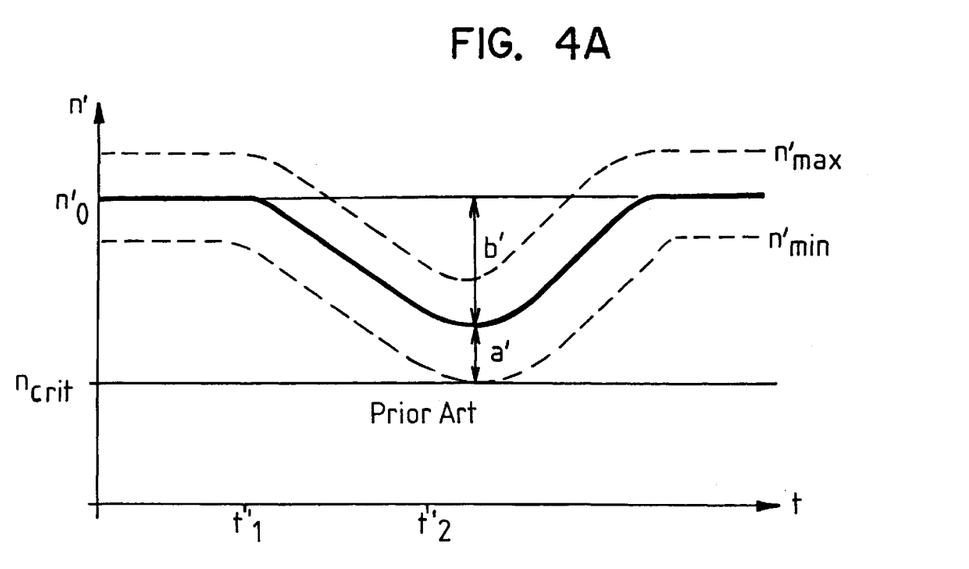
FIG. 4A is a graph illustrating the relationships between the set idle speed, the critical speed and the minimum and maximum actual idle speeds during load engagement in a prior art drive system.

FIG. 4A illustrates the idle speed n' (averaged over rotation irregularities), the set idle speed $n_0'$, and a critical speed $n_{crit}$, each as a function of time for a conventional idle control system (i.e., one that does not have the benefit of an electric machine 3). In principle, because of the relatively imprecise control of the idle speed by means of a filling or ignition intervention, even without a load change relatively large deviations occur between the set idle speed $n_0'$ and the idle speed n', so that the latter lies in a relatively wide band between $n'_{min}$ and $n'_{max}$. Because of the relatively slow control provided by conventional filling intervention, the load increase (here at time $t_1'$) is only counteracted relatively late (here at time $t_2'$) and the idle speed can thus diminish quite far before the filling intervention takes effect. To prevent the idle speed from falling below the critical speed $n_{crit}$, the set idle speed $n_0'$ must be set higher than the critical speed $n_{crit}$ by an amount sufficient to compensate for a) imprecise control (e.g., the amount a' in FIG. 4A) and for b) slow control (e.g., the amount b' in FIG. 4A). In other words, the set idle speed $n_0'$ must be set higher than the critical speed $n_{crit}$ by a total amount a'+b'.

Figure 4B:
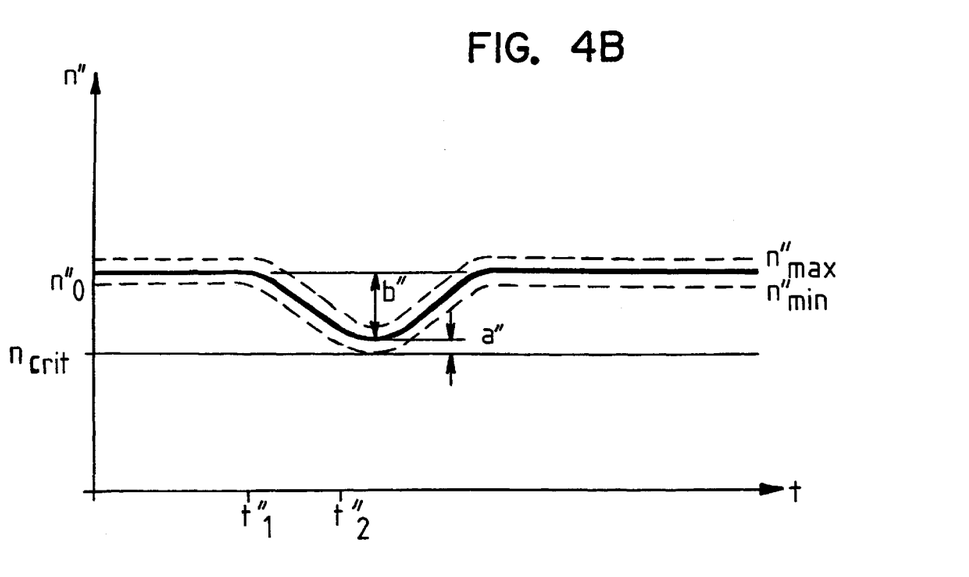
FIG. 4B is a graph illustrating the relationships between the set idle speed, the critical speed and the minimum and maximum actual idle speeds during load engagement in the drive system of FIGS. 1 and 2.

FIG. 4B shows the idle speed n", the set idle speed $n_0"$, and the critical speed $n_{crit}$ of the internal combustion engine 1 employing the intervention of an electrical machine 3 for idle speed regulation in accordance with the teachings of the invention. Because of the significantly more precise control of the idle speed achieved by the electric machine 3, only relatively small deviations occur between the set idle speed, $n_0"$ and the idle speed n" (e.g., in a band between $n"_{min}$ and $n"_{max}$ that is much narrower than the band between $n'_{min}$ and $n'_{max}$). Additionally, because of the much more rapid control, the load increase (here at time $t_1"$) can be counteracted relatively early (here at time $t_2"$). The idle speed n", thus, drops much less during the intervention period in apparatus employing electric machine intervention than those employing conventional intervention alone. To prevent the idle speed from falling below the critical idle speed $n_{crit}$, in apparatus employing electric machine intervention the set idle speed $n_0"$ need only be set higher than the critical speed $n_{crit}$ by an amount a"+b". Overall, the set idle speed $n_0"$ can be set significantly lower (i.e., much closer to the critical speed $n_{crit}$) than in conventional drive systems.

Figure 5:
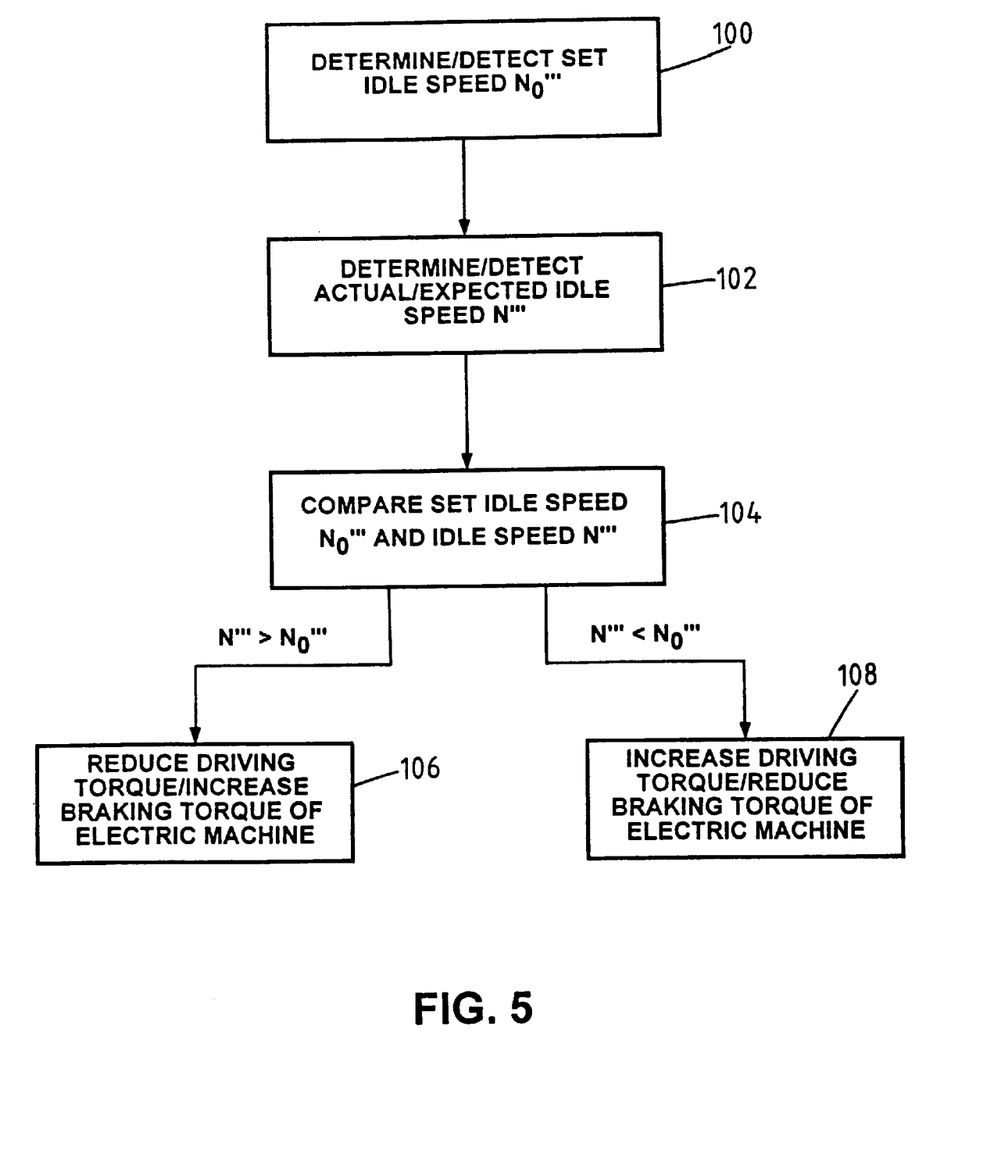
FIG. 5 is a flow chart illustrating the process for counteracting a change in the idle speed of the internal combustion engine implemented by the drive system of FIGS. 1 and 2.

In the method shown in FIG. 5, the constant set idle speed $n_0'''$ is initially detected/determined (block 100). This constant set idle speed $n_0'''$ is obtained from constant parameters, (for example, the employed engine type), and from variable parameters, (for example, the temperature of the internal combustion engine), which influence the set idle speed $n_0'''$. The actual instantaneous idle speed n''' is then detected/determined indirectly (block 102). A disturbance variable compensation can be carried out so that the expected idle speed, not the actual idle speed, is determined. The expected idle speed can be determined, for example, from the instantaneous idle speed and the additional quantities, (like imminent load changes) that will influence this speed.

The idle speed n''' (the actual or expected value) is next compared with the set idle speed $n_0'''$ (block 104). If the value of the idle speed n''' lies above the set idle speed $n_0'''$, the electric machine 3 generates a relative braking torque (block 106). For example, it reduces its driving torque or increases its braking torque. The opposite corrective measures are applied when the value of the idle speed n''' lies below the set idle speed $n_0'''$ (block 108). As explained above, the torque produced by the internal combustion engine 1 can also be reduced by a conventional filling intervention.

From the foregoing, persons of ordinary skill in the art will appreciate that an apparatus for controlling the idling speed of an internal combustion engine has been disclosed which includes an electric machine 3 that responds to an engagement of a load by temporarily applying a torque (or reducing an already applied torque) to the drive shaft 2 until a conventional intervention such as a filling intervention can take effect.

Preferably, the electric machine is controlled so that it applies a driving torque during a reduction in idle speed, which is superimposed on an already applied braking torque (for example, added to it). For example, the electric machine 3 can serve as a generator. During a reduction of idle speed, the generator braking torque is reduced or replaced by a driving torque. Accordingly, during an increase in idle speed the electric machine 3 applies a braking torque or increases its braking torque, or reduces its driving torque, or converts its driving torque to a braking torque.

It is noted that the present invention is not geared toward reducing rotational irregularities that occur essentially periodically as harmonic oscillations to crankshaft rotation because of gas and inertial forces in a reciprocating internal combustion engine. For example, the inertial forces in a four-cylinder, in-line engine lead to rotation irregularity with twice the rotation frequency, for instance, at an idle speed of 600 rpm with a frequency of $20 \text{ s}^{-1}$. Active damping of such rotational irregularities by means of an electric machine is also known, for example, from DE 44 23 577 C2 and DE 40 15 701.

In the present description "speed" is therefore understood to mean a speed value averaged over these rotation irregularities (or freed in some other way of rotation irregularities). The disclosed apparatus reduces deviations of this average speed from a set speed in idle.

Although the disclosed drive system is preferably implemented in a vehicle, such as a wheeled road vehicle, persons of ordinary skill will appreciate that it can be used with other vehicles such as water or rail vehicles without departing from the scope or spirit of the invention. The internal combustion engine 1 preferably serves as a vehicle drive unit. In particular, it is preferably implemented as a piston engine with internal combustion, for example, a spark-ignition or diesel engine. The electric machine 3, is preferably implemented by a rotating machine that can be operated as a motor and, optionally, as a generator. For example, it is preferably implemented as a three phase induction machine.

"Induction machine" is understood to mean a machine without commutators, in which a magnetic rotating field occurs which preferably covers 360°. The machine can be designed as an induction machine, (for example, with a short-circuit rotor 5), or as a synchronous machine, (for example, with a rotor 5 with a salient magnetic pole). The short-circuit rotor 5 in the induction machine can be a hollow squirrel-cage rotor 5 with cage bars in the axial direction. Alternatively, the rotor 5 may be provided with windings that can be externally shorted via slip rings. The salient magnetic pole of the rotor 5 in the synchronous machine is achieved by permanent magnets or electromagnets, which can be fed by an exciter current via slip rings.

The electric machine 3 can be coupled directly, say, via pinions, V-belts, etc. to the engine shaft 2. However, part of the machine 3, especially the rotor 5, advantageously sits directly on, and is optionally coupled to, the engine shaft 2 to rotate in unison therewith. The rotor 5, for example, can sit on the shaft 2 leading to the transmission 8, or, on the other side of the internal combustion engine 1 on the shaft stub that ends blindly there. Another part, namely, the stator 4, is connected to a non-rotatable part or releasably connected, for example, to the engine housing, the gear box or the chassis.

In addition to its idle control function, the electric machine 3 advantageously has one or more additional functions. For example, it can serve as a starter for the internal combustion engine 1, as a generator for power supply, as an additional drive motor for the vehicle, as a vehicle brake, and/or as an active damper for reducing rotation irregularities.

The electric machine 3 can be designed so that the torque it generates is small in comparison to that of the internal combustion engine 1. However, a high torque is advantageous for some additional functions. For example, a large torque producing capability will enable the electric machine 3 to significantly support driving of the vehicle or even drive the vehicle itself.

Persons of ordinary skill in the art will appreciate that the electric machine 3 can be controlled by an open loop approach in which, during a load engagement (for example, connection of a compressor of an air conditioner to the internal combustion engine 1), the electric machine 3 generates a supporting torque that is predetermined in amount and time trend. Alternatively, control can occur by regulation (i.e., closed loop control). For example, a sensor 22 detects the idle speed and sends the data to a controller 24. The controller 24 controls the inverter 11 based on a comparison between the measured idle speed and the set idle speed value, so that the electric machine 3 counteracts a change in idle speed by applying a driving (or, if necessary, a braking) torque and, thus, keeps the speed essentially or precisely at the set idle speed value. The controller 24 can optionally have a P, PI or PID characteristic.

Regulation with disturbance variable compensation is also advantageous. Under such an approach, a disturbance variable (e.g., a load change) is input to the controller 24 of the electric machine 3 to cause a torque intervention before the load change causes a speed change. For example, during connection or disconnection of a large mechanical consumer, (for example, a compressor of an air conditioner), a corresponding signal is issued to the controller 24 indicating that the load is about to be connected or disconnected. The controller 24 then immediately causes the electric machine 3 to compensate for the expected load change, even before the occurrence of a significant speed change can be sensed.

Advantageously, in the disclosed apparatus, the torque applied by the electric machine 3 can be adjusted rapidly and precisely so that idle control occurs almost without delay and without a dead time. As a result, the idle speed does not diminish at all, or at least diminishes much less than it would in a conventional slow control process, (for example, with filling intervention alone). Consequently, the set idle speed of the internal combustion engine 1 can be chosen low without fear of falling short of the critical speed.

Control systems employing the teachings of the invention are advantageous relative to conventional rapid control systems (for example, those employing ignition intervention) because control systems employing the teachings of the invention permit idling with optimal ignition point adjustment.

From the foregoing, persons of ordinary skill in the art will appreciate that the disclosed drive system is advantageous in that it achieves lower fuel consumption, lower exhaust emission, and less noise. The disclosed drive system thus offers a contribution to environmental protection and to sensible use of scarce resources.

As mentioned above, internal combustion drive engines generally mechanically drives part of the drive train and several auxiliary units (for example, servo drives, pumps). A load change is produced by a change in the number of loads being driven or fed and/or a change in their torques. An increase in these quantities is referred to as load engagement, a reduction as load disengagement. A load engagement is present, for example, during connection of a mechanically driven air conditioning compressor, or during engagement of the (previously released) transmission. Conversely, unloading or disengagement occurs when such devices are disconnected and/or when the transmission is disengaged. Load changes that can abruptly assume large values correspondingly lead to sudden large speed changes. Nevertheless, because the electric machine 3 exhibits the rapid intervention characteristics explained above, in the disclosed apparatus the set idle speed can be chosen low without fear of falling short of the critical speed during load engagement.

As mentioned above, the disclosed control system is preferably designed as a disturbance variable compensation control system, in which the disturbance variables are one or more loads.

Since intervention with the electric machine 3 makes ordinary ignition intervention superfluous, the internal combustion engine 1 is advantageously operated when idling almost continuously at the optimal ignition point (if a spark-ignition engine is involved). Generally, the ignition point should, on the one hand, lie relatively early in the cycle for high efficiency and limited thermal loading of the internal combustion engine 1 and, on the other hand, lie relatively late in the cycle for limited exhaust emission. The optimal compromise between these quantities, which also depends on the speed and load, forms the "optimal ignition point". The optional ignition point is the value that would ordinarily be set in an engine in the corresponding operating state, if the engine was not subject to load changes.

After an intervention by the electric machine 3, an internal combustion engine 1 operating parameter is preferably adjusted so that the intervention of the electric machine 3 can be removed after a time. If the internal combustion engine 1 reacts slowly, the short-term control behavior after a sudden load change is determined solely by the electric machine 3. However, it is also possible to involve the internal combustion engine 1 in the short-term control behavior such that it also counteracts the change in idle speed by rapid intervention by changing one or more of its operating parameters. The control system can, for example, alter the supplied amount of air, the fuel air ratio, and/or the ignition point (in which the intervention is preferably via both of the first-named parameters).

In the disclosed apparatus, the electric machine 3 reacts more quickly to a change in idle speed than does the internal combustion engine 1. As a result, a change in idle speed is initially counteracted with the electric machine 3 until the internal combustion engine 1 can be adjusted to take over the intervention. The advantage of this two-stage control, on the one hand, is that the internal combustion engine 1 can always be operated at the optimal ignition point since the torque released by it need only be changed slowly (for example, by filling intervention). On the other hand, the electric machine 3 is only briefly involved in the idle control and is then quickly available again for other tasks (for example, supplying electrical consumers).

During closed loop control of the electric machine 3 and/or internal combustion engine 1, the controller 24, which can be implemented by a microprocessor or ASIC, receives information from a sensor 22 that detects the speed of the internal combustion engine 1, or a quantity that can be derived from the measured speed. In the preferred disturbance variable compensation system, the controller 24 of the electric machine 3 and/or internal combustion engine 1 also receives information from one or more sensors that detect load changes. This information can be control signals informing the controller 24 of imminent connection or disconnection of large consumers.

As explained above, the system preferably has at least one energy storage device 12, 19 which lies at the increased voltage level of a intermediate circuit. At least one consumer (especially a high-power consumer) is advantageously supplied with electrical power from the intermediate circuit at the increased voltage level. This consumer is at least partially fed from the energy storage device 12, 19 lying at the increased voltage level, if the electric machine 3 temporarily delivers less or no electrical power because it is acting to maintain a constant idle speed. Where the electric machine 3 temporarily applies a drive force to keep the idle speed constant, the electric machine 3 is advantageously fed at least partially from the energy storage device 12, 19 lying at the increased voltage level.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. An apparatus for controlling an idling speed of an internal combustion engine comprising:

a first control system for adjusting the idling speed of the internal combustion engine in response to a load change experienced by the internal combustion engine, the first control system having a first reaction time; and a second control system for adjusting the idling speed of the internal combustion engine in response to the load change, the second control system having a second reaction time which is shorter than the first reaction time, the second control system further comprising:

an electric machine operatively coupled to the internal combustion engine for applying a braking torque to the internal combustion engine to reduce the idling speed and for applying a driving torque to the internal combustion engine to increase the idling speed;

an inverter for supplying power to the electric machine; and a controller in communication with the inverter for controlling the electric machine, the controller being responsive to the load change to control the electric machine either to reduce a braking torque or apply a driving torque to the internal combustion engine to substantially maintain the idling speed at a predefined level until the first reaction time has expired.

2. An apparatus as defined in claim 1 wherein the apparatus is used in a vehicle, the inverter comprises an intermediate circuit having a first voltage level, the vehicle has an electrical system with a second voltage level; and the first voltage level is higher than the second voltage level.

3. An apparatus as defined in claim 2 further comprising at least one energy storage device coupled to the intermediate circuit at the first voltage level.

4. An apparatus as defined in claim 3 wherein the electric machine can operate as a generator for developing power and a motor, and further comprising at least one power consumer arranged to receive power from the electric machine, wherein, when the power developed by the electric machine is reduced because the electric machine is adjusting the idling speed, the consumer is at least partially supplied with power from the at least one storage device.

5. An apparatus as defined in claim 3 wherein the electric machine can operate as a generator for developing power and a motor, wherein, when the electric machine operates as a motor, it is supplied with power from the at least one storage device.

6. An apparatus as defined in claim 3 wherein the electric machine can operate as a generator for developing power and a motor, wherein, when the electric machine operates as a generator, it supplies power to the at least one storage device.

7. An apparatus as defined in claim 1 wherein the internal combustion engine is operated at an optimum ignition point when idling.

8. An apparatus as defined in claim 1 further comprising a speed sensor for detecting the speed of the internal combustion engine, at least one of the first control system and the controller being in communication with the speed sensor.

9. An apparatus as defined in claim 1 further comprising a load sensor for detecting load changes, at least one of the first control system and the controller being in communication with the load sensor.

10. An apparatus as defined in claim 9 wherein the load sensor detects a load change before the load change occurs and the at least one of the first control system and the controller initiates adjustment of the idling speed before the load change effects the idling speed of the internal combustion engine.

11. An apparatus for controlling an idling speed of an internal combustion engine comprising:

a first control system for adjusting the idling speed of the internal combustion engine in response to a load change experienced by the internal combustion engine, the first control system having a first reaction time; and a second control system for adjusting the idling speed of the internal combustion engine in response to the load change, the second control system having a second reaction time which is shorter than the first reaction time.

* * * * *

UNITED STATES PATENT AND TRADEMARK OFFICE
CERTIFICATE OF CORRECTION

PATENT NO. : 6,109,237
DATED : August 29, 2000
INVENTOR(S) : Pels et al.

It is certified that error appears in the above-identified patent and that said Letters Patent is hereby corrected as shown below:

On the Cover Page, in Section [63] Related U.S. Application Data:

Please delete "Apr. 2, 1998" and insert --Feb. 4, 1998--

In Column 1, line 6:

Please delete "Apr. 2, 1998" and insert --Feb. 4, 1998--

Signed and Sealed this

Twenty-fourth Day of April, 2001

Attest:

NICHOLAS P. GODICI

*Attesting Officer*    *Acting Director of the United States Patent and Trademark Office*